United States Patent
Lee et al.

(10) Patent No.: US 6,909,825 B2
(45) Date of Patent: Jun. 21, 2005

(54) METHOD OF PACKAGING OPTICAL PARTS FOR OPTICAL COMMUNICATION

(75) Inventors: Hyung Man Lee, Whaseong-Si (KR); Young Min Im, Whaseong-Si (KR); Myung Jin Kim, Sungnam-Si (KR); Hwe Kyung Kim, Seoul (KR); Young Il Kim, Suwon-Si (KR)

(73) Assignee: Korea Electronics Technology Institute, Pyeongtaek (KR)

( * ) Notice: Subject to any disclaimer, the term of this patent is extended or adjusted under 35 U.S.C. 154(b) by 107 days.

(21) Appl. No.: 10/620,204

(22) Filed: Jul. 15, 2003

(65) Prior Publication Data

US 2004/0013363 A1 Jan. 22, 2004

(30) Foreign Application Priority Data

Jul. 15, 2002 (KR) ............................. 10-2002-0041180

(51) Int. Cl.$^7$ ................................................ G02B 8/32
(52) U.S. Cl. ............................. 385/33; 385/16; 385/24; 385/31
(58) Field of Search ............................... 385/16–24, 27, 385/31–34, 37

(56) References Cited

U.S. PATENT DOCUMENTS

| | | | |
|---|---|---|---|
| 6,084,994 A | 7/2000 | Li et al. | |
| 6,167,175 A | 12/2000 | Zheng et al. | |
| 6,266,460 B1 * | 7/2001 | Doerr | ........................... 385/16 |
| 6,351,581 B1 * | 2/2002 | Doerr et al. | .................. 385/24 |

* cited by examiner

Primary Examiner—Phan T. H. Palmer
(74) Attorney, Agent, or Firm—Dilworth & Barrese LLP

(57) ABSTRACT

The present invention relates to a method of packaging optical parts for optical communication. According to the method of the present invention, there are advantages in that a packaging process for optical parts is automated to improve productivity and to obtain price competitiveness and uniformity of quality, and a high frequency heater for locally transferring heat to only a solder preform is used to minimize thermal deformation of areas except a soldering area, thereby achieving highly reliable packaging of the optical parts.

16 Claims, 9 Drawing Sheets

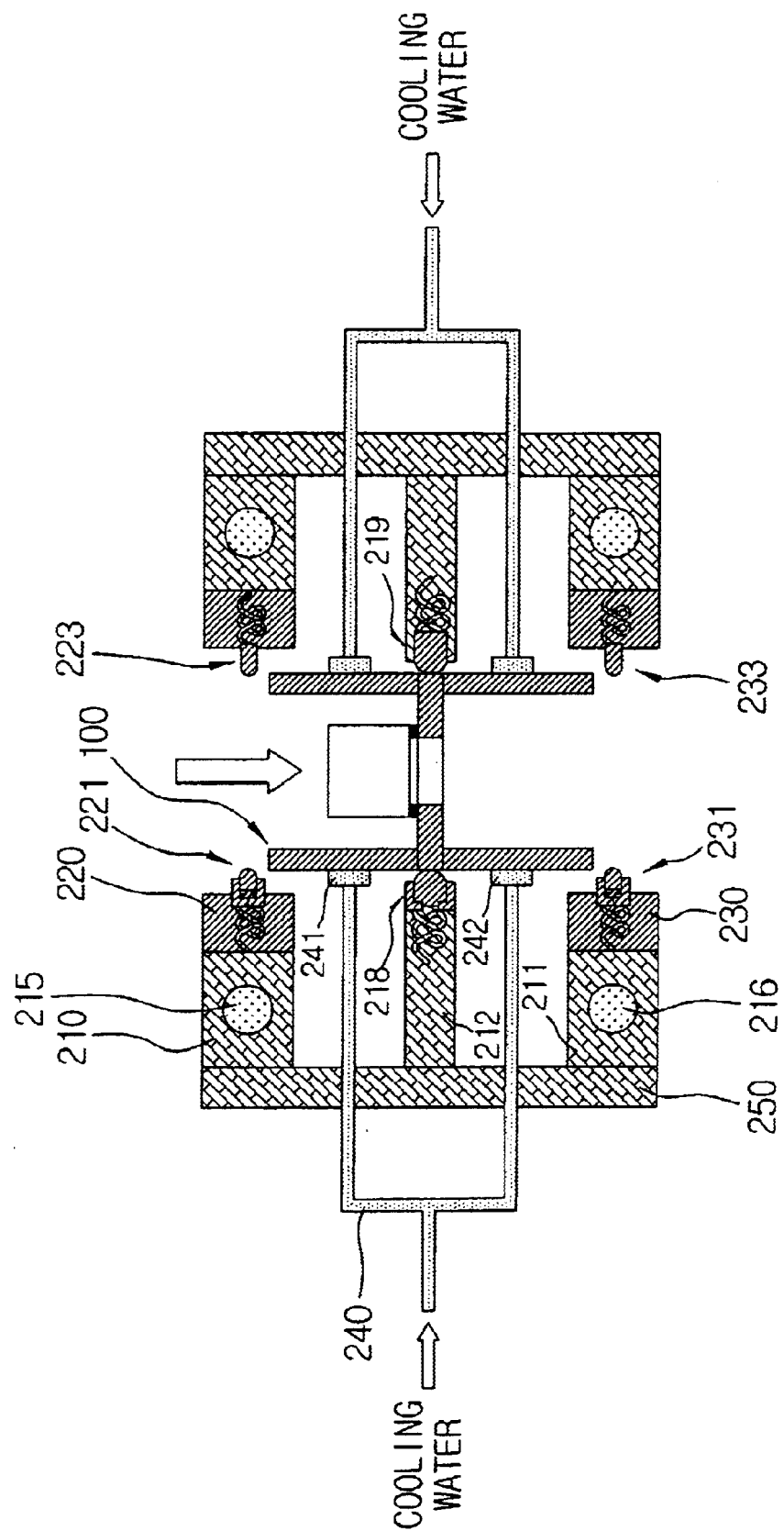

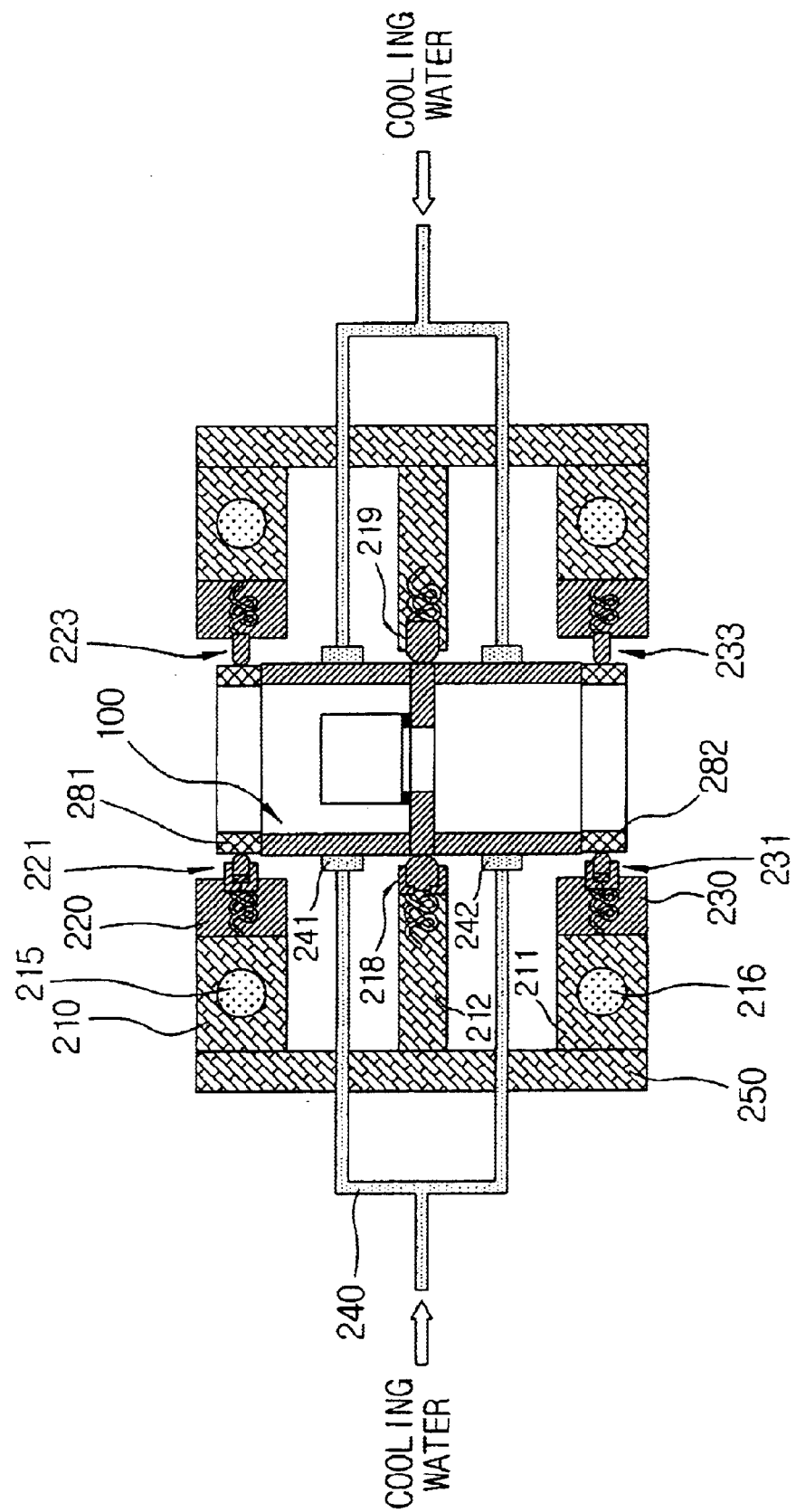

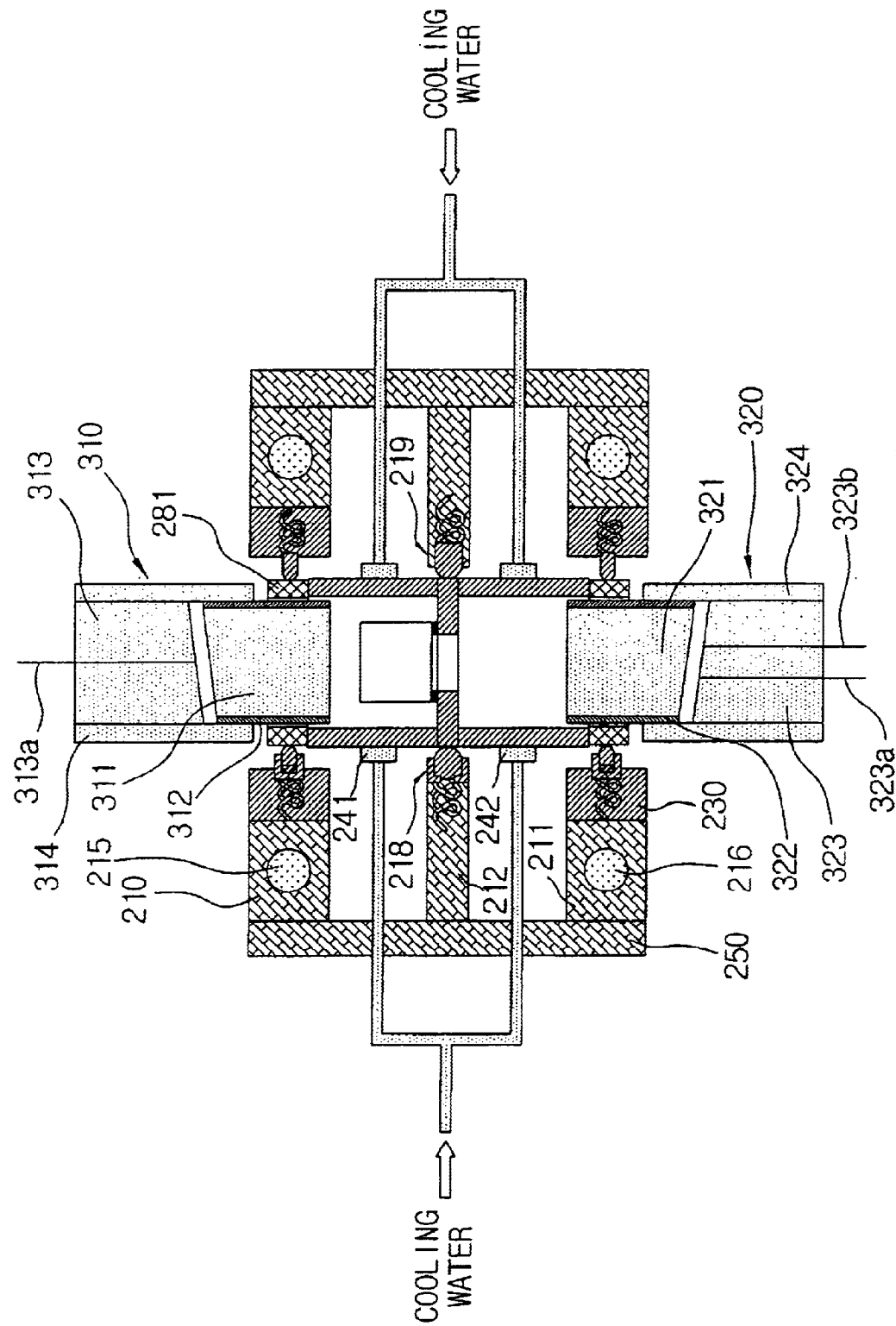

ULTRAVIOLET
RAYS

METHOD OF PACKAGING OPTICAL PARTS FOR OPTICAL COMMUNICATION

BACKGROUND OF THE INVENTION

1. Field of the Invention

The present invention relates to a method of packaging optical parts for optical communication, and more particularly, to a method of packaging optical parts for optical communication, wherein a packaging process for optical parts is automated to improve productivity and to obtain price competitiveness and uniformity of quality, and a high frequency heater for locally transferring heat to only a solder preform is used to minimize thermal deformation of areas except a soldering area, thereby achieving highly reliable packaging of the optical parts.

2. Description of the Prior Art

Recently, as the information and communication technology has been developed rapidly, high-speed communication networks are established between local areas and between countries and a great amount of data are transmitted/received at a high rate therebetween. In long-distance communication and local area communication, an optical fiber has a minimum transmission loss so that optical communication using the optical fiber enables a greater amount of data to be transmitted at a high rate.

Up to now, in the optical communication field, studies on transmission of a large amount of signals at a very high rate have been continuously performed. One of techniques for transmitting a large amount of signals at a very high rate is a wavelength division multiplexing (hereinafter, refer to as "WDM") transmission technique.

Such a WDM optical signal transmission method has a technical feature in that optical signals with different wavelengths are divided or merged and then transmitted at a very high rate. This system has been employed in a field of data exchange and the CATV industry and the range of use thereof becomes gradually wider.

Key optical parts for use in such WDM transmission should have low production costs, superior optical characteristics and high reliability.

A WDM optical filter, which is a kind of optical part performing a WDM function, comprises an optical device, which is constructed of an optical filter attached to a first optical fiber collimator, and a second optical fiber collimator. The WDM optical filter divides or merges optical signals with different wavelengths transmitted to the first optical fiber collimator and then transmits the signals to the second optical fiber collimator.

Further, the WDM optical filter can be manufactured to have high performance and reliability according to collimator aligning and manufacturing techniques, and characteristics of the optical device varies depending on a packaging technique that is a post-process.

Meanwhile, with rapid increase in demands on products to which the optical communication technology is applied and increase in manufacturers thereby, investments and studies for packaging techniques have been continuously made to enhance price competitiveness.

FIG. 1 is a schematic view showing a state where an optical filter part for optical communication is packaged according to the prior art. This optical filter part for the optical communication is a WDM optical filter part disclosed in U.S. Pat. No. 6,167,175.

To package the optical filter part for the optical communication, a filter holder 15 with a filter 14 therein is bonded and fixed by means of epoxy in the center of three communicating tubes that are branched and surrounded by an outer housing 20.

Hereinafter, three communicating tubes are referred to as first, second and third ports 21, 22 and 23, respectively. A first collimator 10 is inserted into and aligned in the first port 21, and then bonded and fixed to the outer housing 20 by means of thermosetting epoxy 16.

Likewise, a second collimator 11 is inserted into and aligned in the second port 22, and a third collimator 12 is inserted into and aligned in the third port 23. Then, the second and third collimators 11 and 12 are bonded and fixed to the outer housing 20 by means of solder 17 applied through holes 24 and 25 formed in the outer housing 20. Thereafter, optical characteristics are inspected, and the packaging process is then completed.

In the conventional packaged WDM described above, when light in which light with a first wavelength $\lambda_1$ and another light with a second wavelength $\lambda_2$ are combined is input into a first optical fiber 31, the light with the first wavelength $\lambda_1$ reflected on the optical filter 14 is transmitted to the second optical fiber 32 through the second collimator 11 and the light with the second wavelength $\lambda_2$ passing through the optical filter 14 is transmitted to the third optical fiber 33 through the third collimator 12.

Therefore, the WDM divides such light including light components with two different wavelengths.

The conventional WDM has a disadvantage in that the packaging size increases upon packaging thereof.

Further, since the solder is injected through the holes formed in the outer housing to fix the collimators to the outer housing, the injection of the solder through the holes causes thermal deformation of the entire part due to a long heating time, thereby lowering the optical characteristics.

More specifically, if the heating time is prolonged, heat resulting from a high temperature of 220 to 250° C. produced during a soldering process is transferred to the entire part. Accordingly, thermal deformation is generated depending on a coefficient of thermal expansion. Upon cooling after completion of the soldering process, the heat deformation caused by the high temperature is contracted, so that an optimum aligning state of WDM is changed.

In addition, in case the collimator is fixed to the outer housing by applying the epoxy, it is weak in the fixing strength and vulnerable to thermal deformation. Thus, there is a disadvantage of the deterioration of reliability.

FIG. 2 is a view showing a structure of another optical filter part for optical communication according to the prior art. First and second optical fibers 61 and 62 are fixed by a first capillary 51 and then aligned with a first green lens 52 with a filter 53 fixed in a leading end thereof.

Thereafter, a second green lens 54 is aligned with a second capillary 55 to which a third optical fiber 63 is fixed, and the second green lens 54 are aligned with the filter 53. Then, the respective unit devices are finally bonded and fixed to one another by using epoxy.

In such an optical filter part for optical communication, when light with a first wavelength $\lambda_1$ is input into the first optical fiber 61 and light with a second wavelength $\lambda_2$ is input into the second optical fiber 62, the light is merged at the filter 53 through the first green lens 52 and then the merged light is transmitted to the third optical fiber 63 through the second green lens 54.

In case of packaging such an optical filter part for optical communication, since the filter and the green lens are bonded directly to each other by means of epoxy, there is a disadvantage in that the reliability becomes lowered depending on temperature.

Since the thermosetting epoxy for use in fixing a single core collimator to an outer housing is cured by means of heating in a chamber, there is another disadvantage in that the optical part must be remounted on a piece of automation equipment to align the optical filter with the single core collimator as a post-process after the curing process.

Therefore, when the manufacture of the optical filter part is automated, it is impossible to continuously carry out operations, and a semi-automation process requiring workers must be performed. Further, the measurement of optical loss is indispensable for finding an optimum aligning position when the optical part is packaged. To this end, the process of cutting, cleaning and connecting optical fibers and other complicated processes are required.

Consequently, since workers should be involved upon construction of the semi-automation process, this causes a problem in that production costs of parts are increased.

SUMMARY OF THE INVENTION

Accordingly, the present invention is conceived to solve the aforementioned problems. An object of the present invention is to provide a method of packaging optical parts for optical communication, wherein a packaging process for optical parts is automated to improve productivity and to obtain price competitiveness and uniformity of quality, and a high frequency heater for locally transferring heat to only a solder preform is used to minimize thermal deformation of areas except a soldering area, thereby achieving highly reliable packaging of the optical parts.

According to one aspect of the present invention for achieving the object, there is provided a method of packaging optical parts for optical communication, comprising the first step of mounting an optical filter onto a hollow cylindrical filter holder of which upper and lower faces are open and communicate with each other; the second step of placing first and second solder preforms on the upper and lower faces of the cylindrical filter holder, respectively; the third step of bring a single core collimator into contact with the first solder preform and a twin core collimator into contact with the second solder preform; the fourth step of optically aligning the single and twin core collimators with the optical filter; and the fifth step of heating and melting the first and second solder preforms and then bonding the single and twin core collimators to the cylindrical filter holder.

According to another aspect of the present invention, there is provided a method of packaging optical parts for optical communication, comprising the first step of providing an apparatus for packaging optical parts, which comprises a pair of hollow cylindrical inner support portions spaced apart from each other, first and second support portions extending outward from the inner support portions, respectively, an outer guide portion connected to the first and second support portions, and a third support portion disposed between the inner support portions and connected to the outer guide portion, said pair of inner support portions and third support portion being provided with resilient jigs facing each other toward an open center of the support portions, and said first and second support portions being provide with high frequency heaters; the second step of mounting an optical filter to a cylindrical filter holder of which upper and lower face are open and communicate with each other; the third step of inserting the cylindrical filter holder, to which the optical filter has been mounted, into the open center of the first and second inner support portions and third support portion so that an outer circumferential surface of the filter holder is supported by the resilient jigs of the third support portion; the fourth step of placing a first ring-type solder preform on an upper surface of the filter holder, supporting the first solder preform by the resilient jigs of the first inner support portion, placing a second ring-type solder preform on a lower surface of the filter holder, and supporting the second solder preform by the resilient jigs of the second inner support portion; the fifth step of bring a single core collimator into contact with an inner side of the first ring-type solder preform, and a twin core collimator into contact with an inner side of the second ring-type solder preform; and the sixth step of aligning the single and twin core collimators with the optical filter, melting the first and second solder preforms by the high frequency heaters mounted to the first and second support portions, and cooling the first and second solder preforms to bond the single and twin core collimators with the filter holder.

BRIEF DESCRIPTION OF THE DRAWINGS

The above and other objects and features of the present invention will become apparent from the following description of preferred embodiments given in conjunction with the accompanying drawings, in which:

FIG. 4 is a top plan view of the filter holder shown in FIG. 3a;

FIGS. 5a to 5c are sectional views illustrating a process performed in an apparatus for packaging optical parts according to the present invention;

DESCRIPTION OF THE PREFERRED EMBODIMENTS

Hereinafter, preferred embodiments of the present invention will be described in detail with reference to the accompanying drawings.

Figure 1:
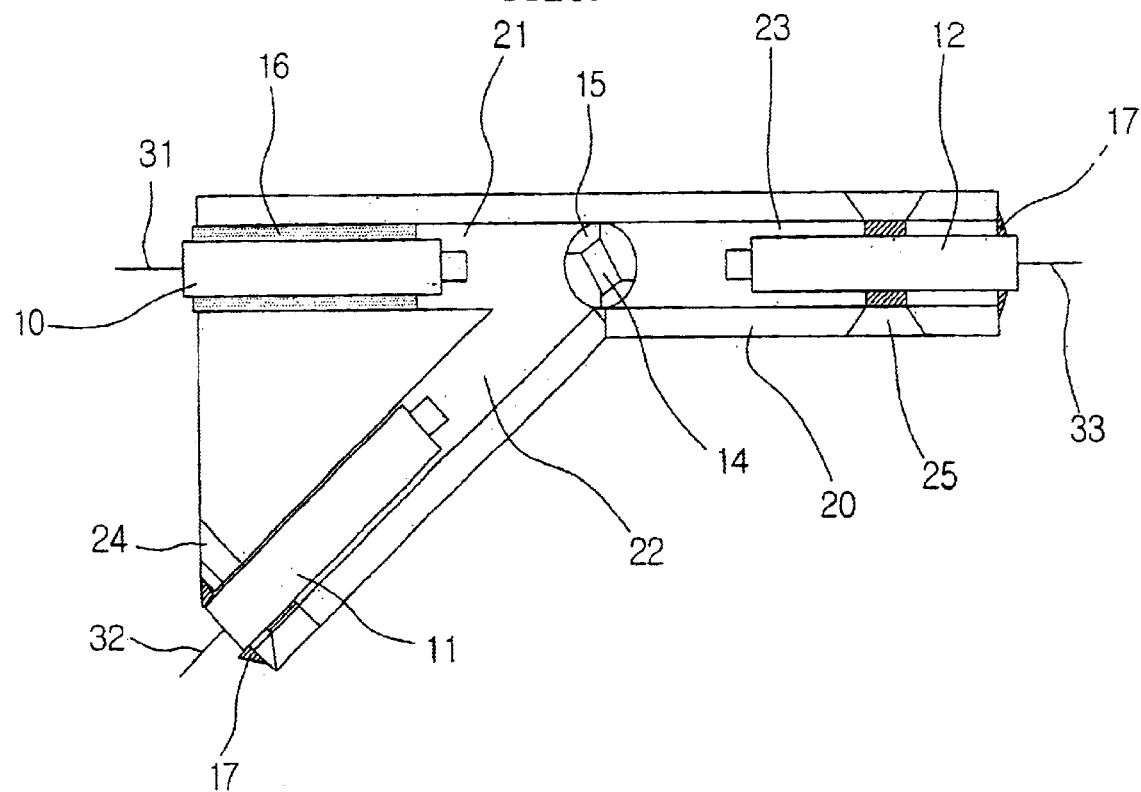
FIG. 1 is a schematic view showing a state where an optical filter part for optical communication is packaged according to the prior art.
Figure 2:
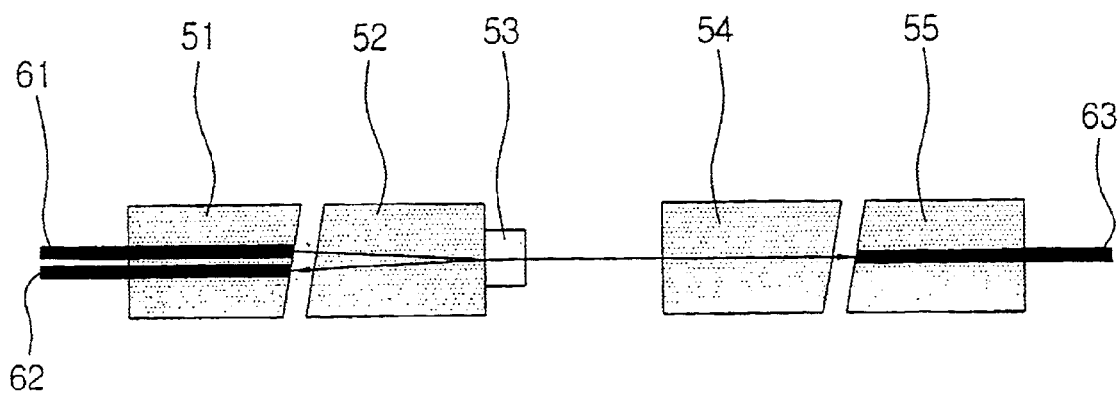
FIG. 2 is a view showing a structure of another optical part for optical communication according to the prior art.
Figure 3A:
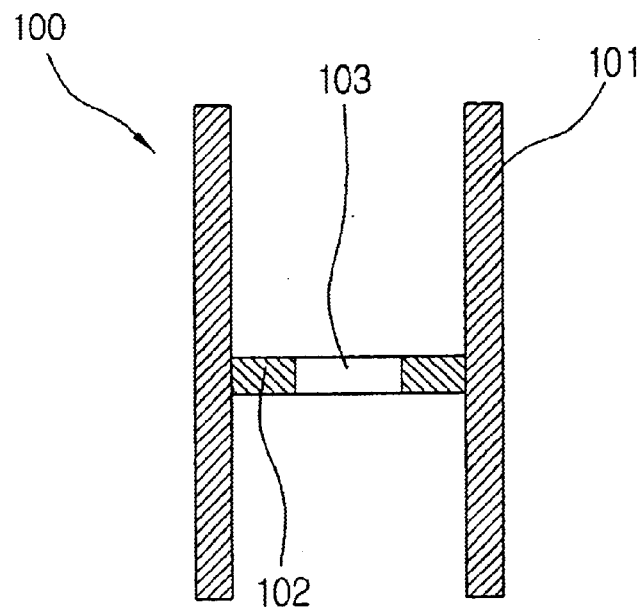
FIGS. 3a and 3b are sectional views illustrating a process for coupling an optical filter with a filter holder according to the present invention.
Figure 3B:
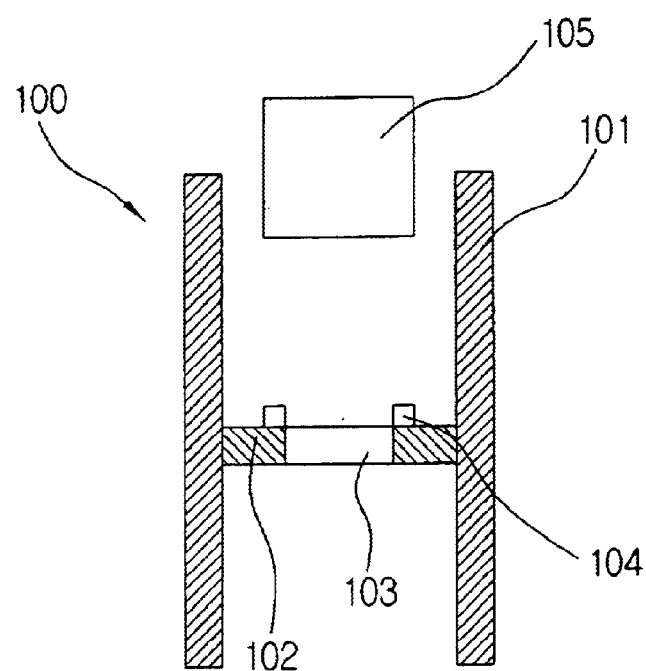

FIGS. 3a and 3b are sectional views illustrating a process for coupling an optical filter with a filter holder according to the present invention. First, a filter holder 100 that comprises a hollow tubular body 101 and a seating portion 102 is prepared (see FIG. 3a). The filter holder 100 has cylindrical inner and outer surfaces, and top and bottom faces that are open and communicate with each other. The seating portion 102 is formed to be in close contact with the inner surface of the tubular body 101 and has a hole 103 formed in the center thereof. Thermosetting epoxy 104 is applied around the hole 103 formed in the seating portion 102 of the filter holder 100, and an optical filter 105 is then pressed against the thermosetting epoxy 104 applied to the top of the seating portion 102 to be bonded thereto (see FIG. 3b).

Then, the thermosetting epoxy 104 is cured in a hot chamber so that the optical filter 105 can be coupled with the filter holder 100. Therefore, the process is completed.

Figure 4:
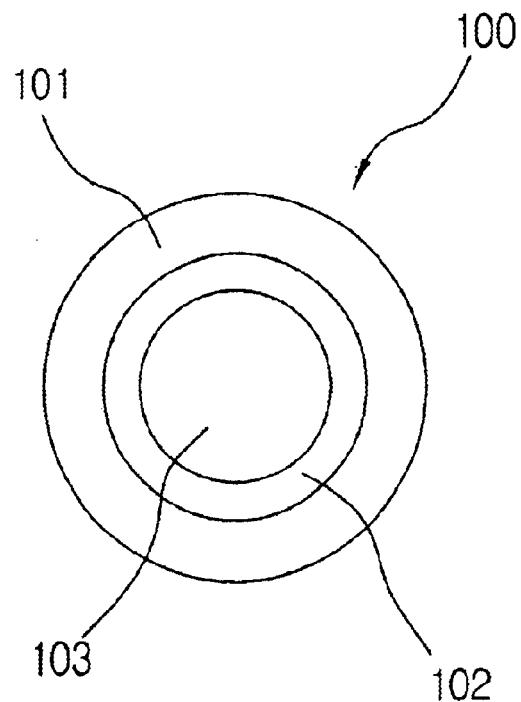
Figure 9A:
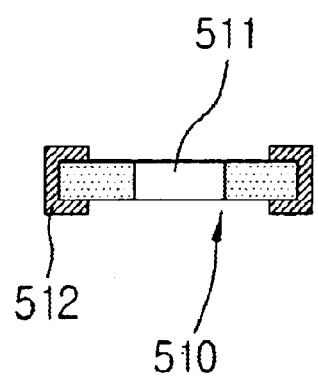
FIGS. 9a to 9d are sectional views illustrating a process for coupling an optical filter with another filter holder according to the present invention.

FIG. 4 is a top plan view of the filter holder shown in FIG. 3a, wherein the filter holder 100 comprises the tubular body 101 and the seating portion 102 with the hole 103 formed in the center thereof.

FIGS. 5a to 5c are sectional views illustrating a process performed in an apparatus for packaging optical parts according to the present invention. The apparatus shown in FIG. 5a comprises a pair of hollow cylindrical inner support portions 220 and 230 spaced apart from each other; first and second support portions 210 and 211 extending outward from the inner support portions 220 and 230, respectively; an outer guide portion 250 connected to the first and second support portions 210 and 211; and a third hollow support portion 212 located between the inner support portions 220 and 230 and connected to the outer guide portion 250.

Further, the pair of inner support portions 220 and 230 and the third support portion 212 are provided with resilient jigs 221, 223; 231, 233; and 218, 219 of which each pair face each other toward the hollow center, respectively. (When an object is inserted between the jigs, the resilient jigs are retracted by means of springs or equivalent means thereof and hold the object by means of elastic forces of the springs or equivalent means expanding toward the object. In the present invention, the jigs hold the filter holder.)

In addition, high frequency heaters 215 and 216 are mounded to the first and second support portions 210 and 211, respectively.

Furthermore, cooling pipes 240 are disposed between the first and third support portions 210 and 212 and between the second and third support portions 211 and 212, pads 241 and 242 are connected to ends of the cooling pipes 240, the other ends of the cooling pipes penetrate through the outer guide portion 250 and are connected to a cooling water supplying means (not shown) provided at the exterior of the apparatus.

As shown in FIG. 5a, in the process of packaging optical parts using the apparatus constructed as above, the filter holder 100 shown in FIG. 3 is inserted into an open area defined by the first and second inner support portions 220 and 230 and third support portion 212. Thus, the outer surface of the filter holder 100 (the outer surface of the tubular body 101 in FIG. 3b) comes into contact with and is supported by the resilient jigs 218 and 219 of the third support portion 212.

At this time, the pads 241 and 242 connected to the cooling pipe 240 come into contact with the outer surface of the filter holder 100.

Thereafter, a first ring-type solder preform 281 is located on an upper surface of the filter holder 100 to be held by the resilient jigs 221 and 223 of the first inner support portions 220. A second ring-type solder preform 282 is located on an lower surface of the filter holder 100 to be held by the resilient jigs 231 and 233 of the second inner support portions 230 (see FIG. 5b).

Finally, as shown in FIG. 5c, a green lens 311 of a single core collimator 310 is inserted into the first ring-type preform 281, and a green lens 321 of a twin core collimator 320 is inserted into the second ring-type preform 282.

After the single and twin core collimators 310 and 320 are aligned with each other, the first and second solder preforms 281 and 282 are melted using the high-frequency heaters 215 and 216 provided at the first and second support portions 210 and 211 and then cooled, so that the single and twin core collimators 310 and 320 are bonded to the filter holder 100.

The single and twin core collimators 310 and 320 may be finely adjusted and aligned by a multi-shaft electromotor and grippers connected to the electromotor that are not shown in FIG. 5c. That is, pigtails of the collimators are gripped by the grippers and the collimators are then aligned by moving the grippers using the multi-shaft electromotor connected to the grippers.

The bonding process is performed by soldering the solder preforms 281 and 282 with an optimum temperature profile through preheating, thermal diffusing and solder melting at a temperature of 150° C. to 220° C. and natural cooling.

To establish such an optimum temperature profile, thermocouples are mounted to the first and second inner support portions 220 and 230 to sense temperatures of the solder preforms, and the sensed temperatures are fedback to a program controller to be described later so that the program controller controls heating temperatures of the high-frequency heaters. Thus, the soldering process can be more easily performed.

Furthermore, since the solder preforms are heated at a high temperature, heat may be transferred to the filter holder 100 and thus thermal deformation may be produced at the optical filter mounted to the filter holder 100 and the seating portion. According to one of features of the present invention, cooling water is supplied to the cooling pipes 240 to cool the filter holder 100 while operating the high frequency heaters. Thus, the heat transfer from the high frequency heaters to the filter holder 100 can be reduced.

Accordingly, since the present invention can minimize thermal deformation during the process of packaging optical parts, it is possible to prevent characteristics of the manufactured optical parts from being lowered due to thermal deformation.

Alternatively, in the present invention, the filter holder 100 is to be made of glass material, gold plating films are formed on upper and lower inner surfaces or upper and lower surfaces of the filter holder, and the first and second solder preforms 281 and 282 are placed to be in contact with the gold plating films so that the filter holder can be bonded to the green lenses 311 and 321 of the single and twin core collimators 310 and 320.

According to such a soldering method, heat generated in the soldering process is not transferred to the optical filter 105 so that it is possible to increase the reliability of the optical parts.

Meanwhile, in the single core collimator 310, the pigtail 313 with an optical fiber 313a is aligned with a green lens 311, and the pigtail 313 and green lens 311 are inserted into and coupled with a glass tube 314 by means of epoxy.

At this time, if a metal coating layer 312 is formed on an outer circumferential surface of the green lens 311, a superior bonding force can be obtained between the solder preform 281 and the green lens.

Moreover, compared with a conventional green lens having an outer circumferential surface coated with epoxy, the green lens 311 with the metal coating layer 312 formed thereon according to the present invention is capable of further enhancing an optical collimating characteristic.

In the mean time, the twin core collimator 320 consists of a pigtail 323 with two optical fibers 323a and 323b, and the pigtail 323 is coupled with the green lens 321 by the glass tube 324 in the same manner as the single core collimator 310.

Figure 6:
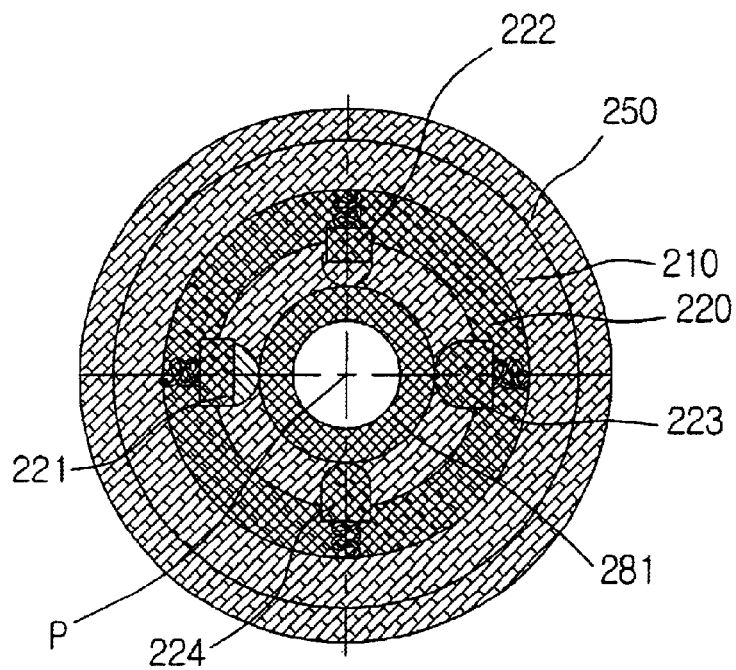
FIG. 6 is a plan view showing a portion of the apparatus for packaging optical parts shown in FIG. 5b.

FIG. 6 is a plan view showing a portion of the apparatus for packaging optical parts shown in FIG. 5b. The first support portion 210 and the first inner support portion 220 are formed at the inner side of the outer guide portion 250. The pair of first and third elastic jigs 221 and 223 facing each other and the pair of second and fourth jigs 222 and 224 facing each other are formed at the inner side of the first inner support portion 220.

The first solder preform 281 is supported by inner ends of the first to fourth elastic jigs 221, 222, 223 and 224.

At this time, when the first ring-type solder preform 281 is supported by the first to fourth elastic jigs 221, 222, 223 and 224, the center P of the apparatus should coincide with the center of the first solder preform 281. To this end, in the present invention, an elastic force $K_2$ of the third and fourth elastic jigs 223 and 224 is set to be twice as large as an elastic force $K_1$ of the first and second elastic jigs 221 and 222 so that the centers can coincide with each other by jaws formed on the first and second elastic jigs 221 and 222 (That is, referring to FIGS. 5a and 5b, since the elastic jigs designated by reference numerals 221 and 222 are caught by the jaws and cannot be further retracted in FIG. 5b showing a state in which the solder preforms are mounted, the centers of the solder preform and the apparatus coincide with each other).

Such a method may be variously modified and performed.

Figure 7:
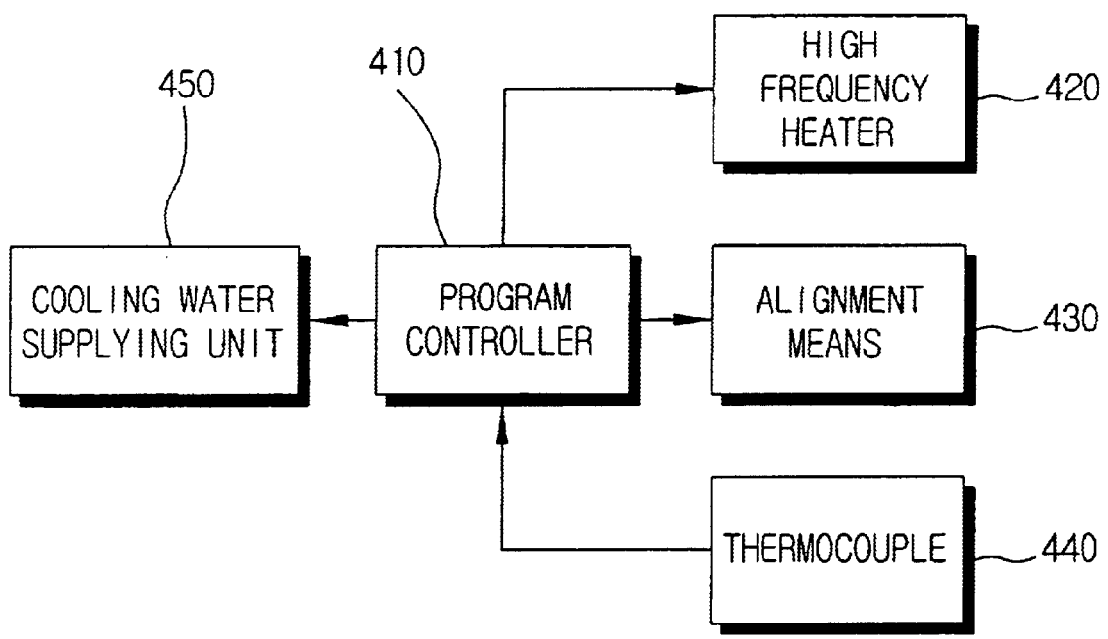
FIG. 7 is a block diagram illustrating control of the apparatus for packaging optical parts according to the present invention.

FIG. 7 is a block diagram illustrating control of the apparatus for packaging optical parts according to the present invention. The program controller 410 controls an alignment means 430 that causes the collimators to be aligned with each other, and the temperature achieved by a high frequency heater 420 based on the temperature of the solder preform measured by a thermocouple 440 and fed-back to the controller. Further, the program controller controls the supply of cooling water from a cooling water-supplying unit 450. Thus, the optical parts can be packaged automatically.

Figure 8:
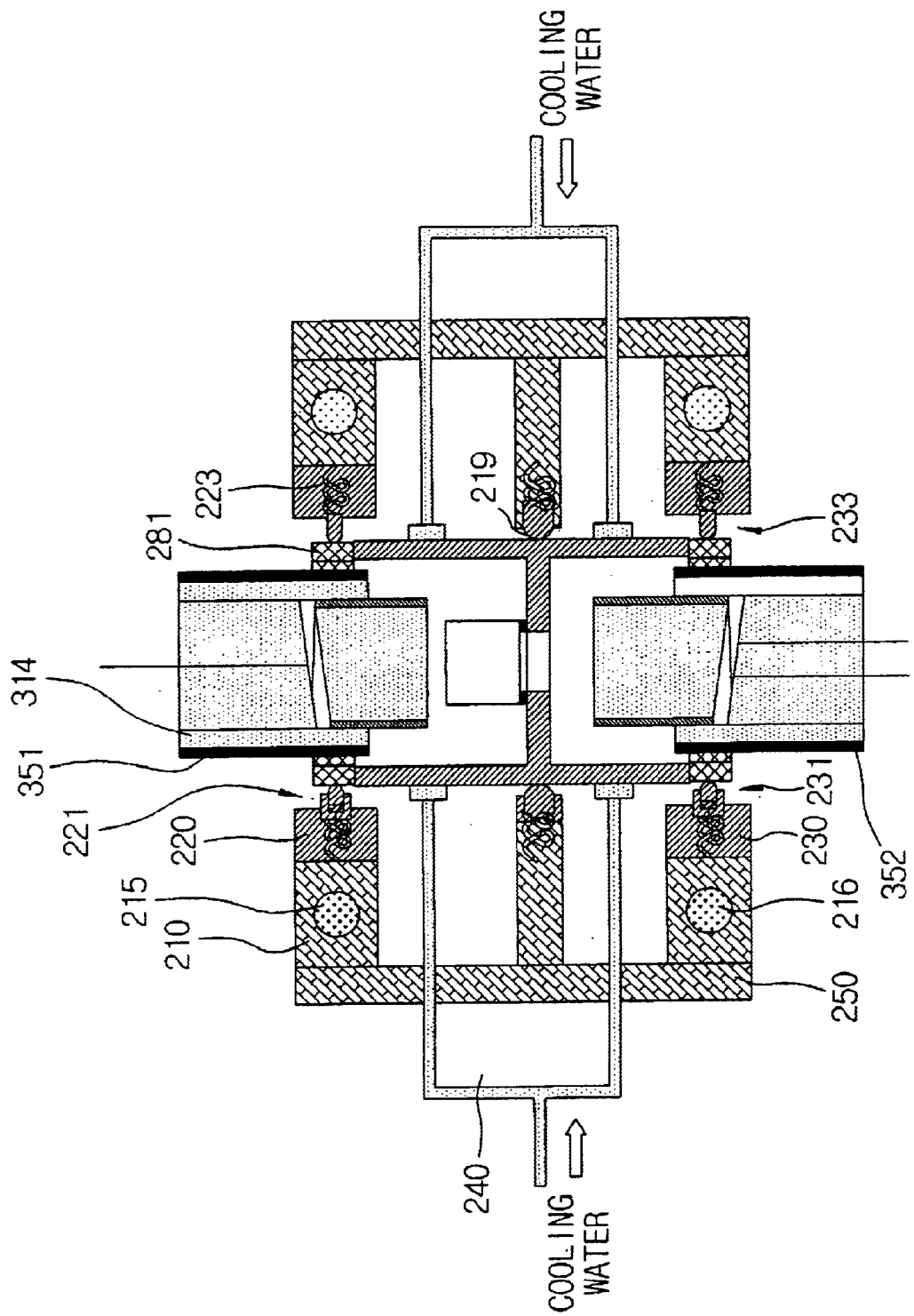
FIG. 8 is a sectional view illustrating a process performed in the apparatus for packaging other optical parts according to the present invention.
Figure 9B:
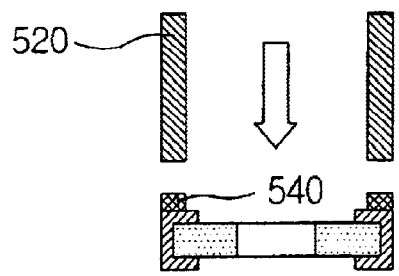
Figure 9C:
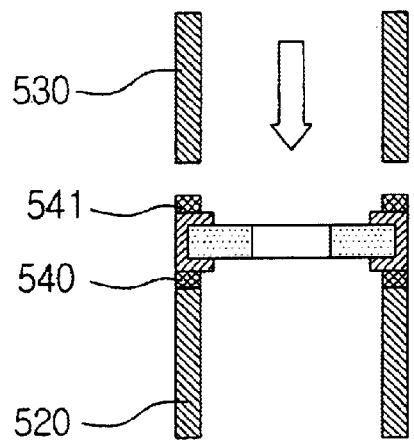
Figure 9D:
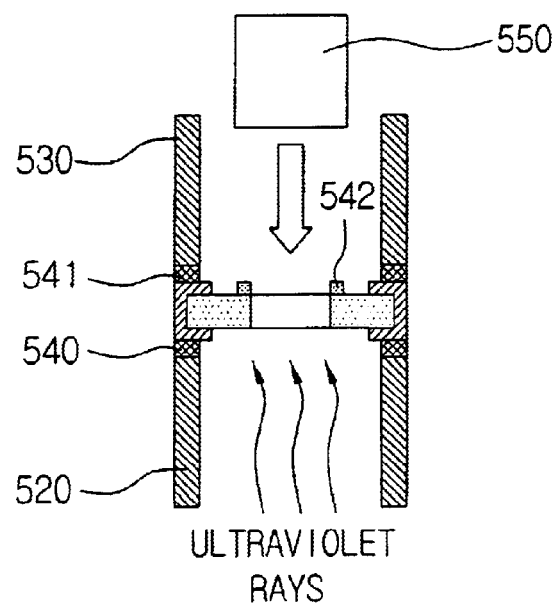

FIG. 8 is a sectional view illustrating a process performed in the apparatus for packaging other optical parts according to the present invention. Metal coating layers 351 and 352 are formed on outer circumferential surfaces of the glass tubes 314 and 324 of the single core collimator 310 and twin core collimator 320, which couple respective pigtails and green lenses with each other. The first and second solder preforms 281 and 282 are melted and bonded to the metal coating layers 351 and 352.

At this time, instead of forming the metal coating layers on the glass tubes 314 and 324, the glass tubes may be inserted into metal tubes.

FIGS. 9a to 9d are sectional views illustrating a process for coupling an optical filter with another filter holder according to the present invention. First, a metal coating layer 512 is formed to cover an outer surface of a cylindrical glass seating portion 510 with a hole 511 formed in the center thereof (see FIG. 9a). Second, ultraviolet ray-curable epoxy 540 is applied to an upper surface of the metal coating layer 512 and a first tubular body 520 is bonded to the metal coating layer 512 (see FIG. 9b) via the epoxy 540.

Third, the seating portion is inverted such that a lower surface of the metal coating layer 512 faces upward, and ultraviolet ray-curable epoxy 541 is applied to the upward facing surface of the metal coating layer 512. Then, a second tubular body 530 is bonded to the metal coating layer 512 via the epoxy 541 (see FIG. 9c).

Finally, ultraviolet ray-curable epoxy 542 is applied to an upper surface of the glass seating portion 510 and an optical filter 550 is bonded to the glass seating portion 510. Then, ultraviolet rays are irradiated to cure the epoxy 540, 541 and 542 (see FIG. 9d).

Therefore, the process of coupling the optical filter with the filter holder is completed.

At this time, it is preferred that the first and second tubular bodies 520 and 530 be made of Steel special Use Stainless (SUS).

It is also preferred that the metal coating layer 512 be formed of gold (Au).

According to the present invention described above, there are advantages in that a packaging process for optical parts is automated to improve productivity and to obtain price competitiveness and uniformity of quality, and a high frequency heater for locally transferring heat to only a solder preform is used to minimize thermal deformation of areas except a soldering area, thereby achieving highly reliable packaging of the optical parts.

In addition, since an outer housing used in the prior art is not required in the present invention, there is an advantage in that production costs can be lowered due to curtailment of materials.

Although the present invention has been described in connection with the preferred embodiments of the present invention, it will be apparent to those skilled in the art that various modifications and changes can be made thereto without departing from the technical spirit and scope of the invention, and such modifications and changes will fall within the scope of the invention defined by the appended claims.

What is claimed is:

1. A method of packaging optical parts for optical communication, comprising:

the first step of mounting an optical filter onto a hollow cylindrical filter holder of which upper and lower faces are open and communicate with each other;

the second step of placing first and second solder preforms on the upper and lower faces of the cylindrical filter holder, respectively;

the third step of bring a single core collimator into contact with the first solder preform and a twin core collimator into contact with the second solder preform;

the fourth step of optically aligning the single and twin core collimators with the optical filter; and the fifth step of heating and melting the first and second solder preforms and then bonding the single and twin core collimators to the cylindrical filter holder.

2. The method as claimed in claim 1, wherein each of the single and twin core collimators has a pigtail with at least one optical fiber, and a green lens with a metal coating layer formed on an outer circumferential surface thereof and aligned with the pigtail, and the pigtail and the green lens are inserted into and coupled with a glass tube by means of epoxy.

3. The method as claimed in claim 2, wherein the first and second solder preforms take the shape of a ring of which an inner portion is hollow, and the third step comprises the step of inserting the glass tube of the single core collimator into the first ring-type solder preform to be in contact therewith, and the glass tube of the twin core collimator into the second ring-type solder preform to be in contact therewith.

4. The method as claimed in claim 2, wherein the first and second solder preforms take the shape of a ring of which an inner portion is hollow, and the third step comprises the step of inserting the green lens of the single core collimator into the first ring-type solder preform to be in contact therewith, and the green lens of the twin core collimator into the second ring-type solder preform to be in contact therewith.

5. The method as claimed in claim 2, wherein a metal coating layer is formed on an outer circumferential surface of the glass tube.

6. The method as claimed in claim 1, wherein the first step comprises the steps of:

forming a metal coating layer to cover an outer circumferential surface of a cylindrical glass seating portion with a hole formed in the center thereof;

applying ultraviolet ray-curable epoxy on an upper surface of the metal coating layer, and bonding a first tubular body to the metal coating layer;

inverting the seating portion such that a lower surface of the metal coating layer faces upward, applying ultraviolet ray-curable epoxy on the upward facing surface of the metal coating layer, and bonding a second tubular body to the metal coating layer; and applying ultraviolet ray-curable epoxy on an upper surface of the glass seating portion, bonding the optical filter to the glass seating portion, and irradiating ultraviolet rays to cure the epoxy.

7. The method as claimed in claim 6, wherein the first and second tubular bodies are made of Steel special Use Stainless.

8. The method as claimed in claim 1, wherein in the second step, the cylindrical filter holder is made of glass material, gold plating layers are formed on upper and lower surfaces or inner surfaces of the upper and lower portions of the cylindrical filter holder, and the first and second solder preforms are in contact with the gold plating layers.

9. The method as claimed in claim 1, wherein the first step comprises the steps of:

preparing the filter holder, said filter holder including a hollow tubular body, which has cylindrical inner and outer circumferential surfaces and the open upper and lower faces communicating with each other, and a seating portion which is formed to be in close contact with the inner circumferential surface of the tubular body and has a hole formed in the center thereof;

applying thermosetting epoxy around the hole formed in the seating portion of the filter holder, and pressing the filter holder against the thermosetting epoxy to be bonded to an upper surface of the seating portion; and curing the thermosetting epoxy in a hot chamber to couple the optical filter with the filter holder.

10. A method of packaging optical parts for optical communication, comprising:

the first step of providing an apparatus for packaging optical parts, said apparatus comprising a pair of hollow cylindrical inner support portions spaced apart from each other, first and second support portions extending outward from the inner support portions, respectively, an outer guide portion connected to the first and second support portions, and a third support portion disposed between the inner support portions and connected to the outer guide portion, said pair of inner support portions and third support portion being provided with resilient jigs facing each other toward an open center of the support portions, and said first and second support portions being provide with high frequency heaters;

the second step of mounting an optical filter to a cylindrical filter holder of which upper and lower face are open and communicate with each other;

the third step of inserting the cylindrical filter holder, to which the optical filter has been mounted, into the open center of the first and second inner support portions and third support portion so that an outer circumferential surface of the filter holder is supported by the resilient jigs of the third support portion;

the fourth step of placing a first ring-type solder preform on an upper surface of the filter holder, supporting the first solder preform by the resilient jigs of the first inner support portion, placing a second ring-type solder preform on a lower surface of the filter holder, and supporting the second solder preform by the resilient jigs of the second inner support portion;

the fifth step of bring a single core collimator into contact with an inner side of the first ring-type solder preform, and a twin core collimator into contact with an inner side of the second ring-type solder preform; and the sixth step of aligning the single and twin core collimators with the optical filter, melting the first and second solder preforms by the high frequency heaters mounted to the first and second support portions, and cooling the first and second solder preforms to bond the single and twin core collimators with the filter holder.

11. The method as claimed in claim 10, wherein each of the single and twin core collimators has a pigtail with at least one optical fiber, and a green lens with a metal coating layer formed on an outer circumferential surface thereof and aligned with the pigtail, and the pigtail and the green lens are inserted into and coupled with a glass tube by means of epoxy.

12. The method as claimed in claim 11, wherein the fifth step comprises the step of inserting the glass tube of the single core collimator into the first ring-type solder preform to be in contact therewith, and the glass tube of the twin core collimator into the second ring-type solder preform to be in contact therewith.

13. The method as claimed in claim 11, wherein the fifth step comprises the step of inserting the green lens of the single core collimator into the first ring-type solder preform to be in contact therewith, and the green lens of the twin core collimator into the second ring-type solder preform to be in contact therewith.

14. The method as claimed in claim 11, wherein a metal coating layer is formed on an outer circumferential surface of the glass tube.

15. The method as claimed in claim 10, wherein the apparatus further comprises cooling pipes located between the first and third support portions and between the second and third support portions, each of cooling pipes having ends connected to pads and the other ends penetrating through the outer guide portion and being connected to a cooling water supplying means provided at the exterior of the apparatus, the third step further comprises the step of bring the pads connected to the cooling pipes into contact an outer circumferential surface of the filter holder, and the sixth step further comprises the step of supplying cooling water to the cooling pipes to lower the temperature of the filter holder when the high frequency heaters are operated.

16. The method as claimed in claim 10, wherein the sixth step comprising the steps of preheating the first and second solder preforms, performing thermal diffusion and melting the solder preforms at a temperature of 150° C. to 220° C. and then naturally cooling the solder preforms.

* * * * *